United States Patent

Perlich

[11] Patent Number: 4,776,928
[45] Date of Patent: Oct. 11, 1988

[54] DUAL DUROMETER EDGE PROTECTOR STRIPS FOR ELECTROLYTIC CELLS ELECTRODES

[76] Inventor: J. Russell Perlich, 5926 East Miramar Dr., Tucson, Ariz. 85715

[21] Appl. No.: 139,916

[22] Filed: Dec. 31, 1987

[51] Int. Cl.⁴ ............................................. C25D 1/00
[52] U.S. Cl. ..................................... 204/12; 204/281
[58] Field of Search ........................ 204/12, 279, 281

[56] References Cited
U.S. PATENT DOCUMENTS
4,406,769 9/1983 Berger .................................. 204/281

Primary Examiner—T. M. Tufariello
Attorney, Agent, or Firm—Cahill, Sutton & Thomas

[57] ABSTRACT

An edge protector for an electrowinning electrode includes a dual-durometer co-extruded structure including a rigid U-shaped member having parallel legs that define slots receiving an edge of the electrode and a pair of resilient lips attached to the ends of the legs and pressing tightly against the opposed edge surface portions of the electrode to impede penetration of electrolyte thereto.

10 Claims, 1 Drawing Sheet

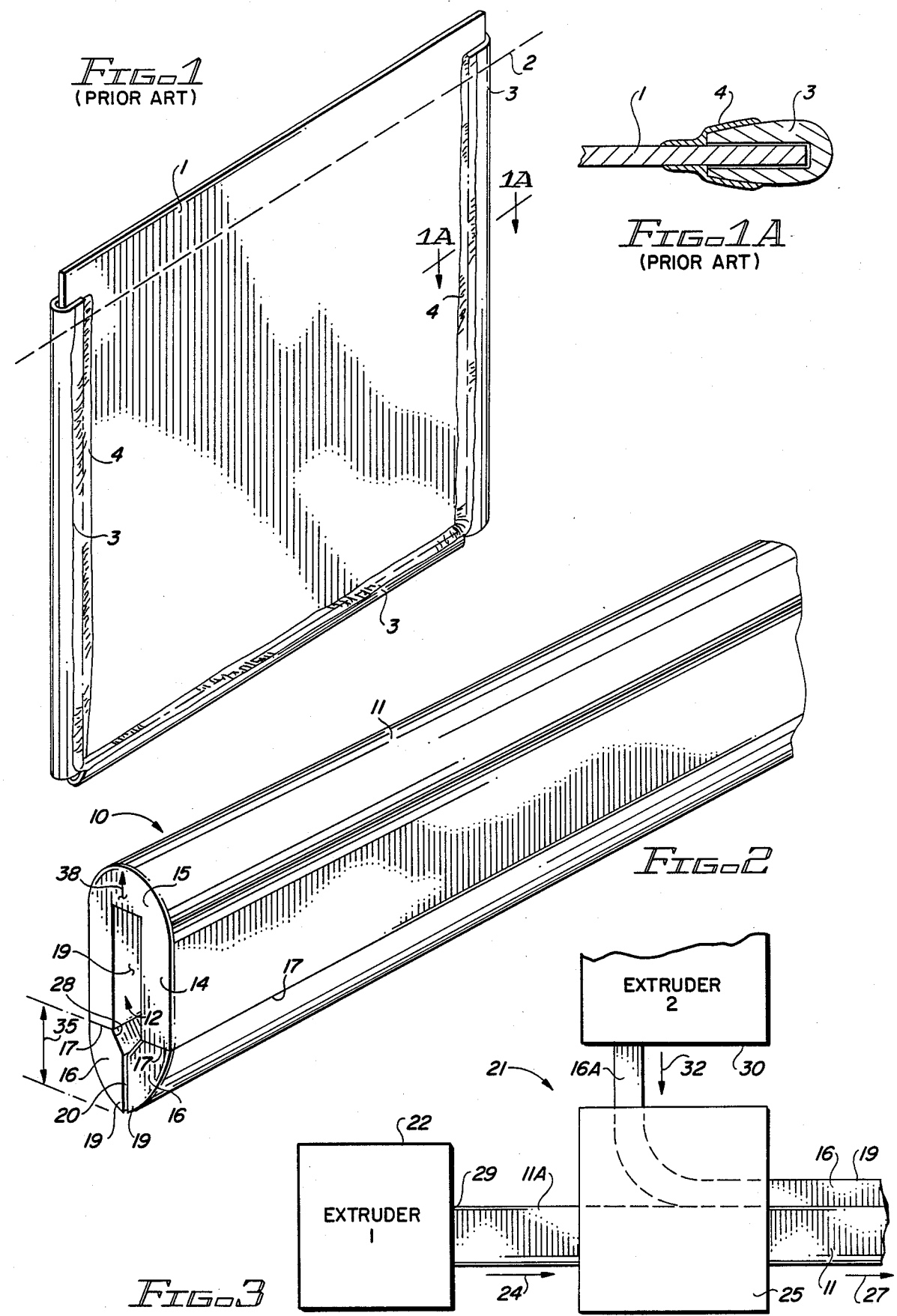

DUAL DUROMETER EDGE PROTECTOR STRIPS FOR ELECTROLYTIC CELLS ELECTRODES

BACKGROUND OF THE INVENTION

The invention relates to edge protectors or "edge strips" used for preventing deposition of metals on edges of electrode plates in electrolytic cells.

Edge protectors, also referred to as "edge strips", commonly are utilized to prevent electrodeposition of recovered metal on "blank" electrolytic cell electrode plates (hereinafter, simply "electrodes" or "cathodes") in order to facilitate removal of thin (i.e., one-eighth of an inch) layers of metal from the cathodes. Typically, the cathode is lifted or "pulled" from the cell after the deposition of the layers or sheets of recovered metal on the opposite faces of a blank cathode is complete. The sheets of electrodeposited metal then are removed, for example by hand or by means of an automatic stripping machine which may strike the cathode while directing a high velocity jet of air at the edge of the cathode between the cathode surfaces and the thin sheets of electrodeposited metal being removed. It is important that the edges of the removed sheets of recovered metal be straight and non-jagged. Some conventional edge strips consist of extruded plastic U-shaped channels that rely on the "resilience" of the plastic to maintain a sufficient contact or "grip" with the surface of the blank electrode on which they are installed. Other known edge strips are held in place on the edge of a cathode by transverse pins extending through the sides of the edge strip and through the edge portion of the blank cathode. Such conventional edge strips do not prevent ingrowth of deposited metal between the edge strip and the edge surface portion of the cathode. The elasticity or resilience of the U-shaped channel of a typical prior edge strip is insufficient to press the opposed inner surfaces of the grooves formed by that U-shaped channel sufficiently tightly against the portions of the opposed surfaces along an edge of the cathode. Therefore, the prior edge strips do not effectively seal the portions of the opposed surfaces along the edge portions of the cathode from the electrolyte. To overcome this problem, expensive, complex equipment often is utilized to spray wax "beads" along the edges of plastic U-channel shaped edge strips after they are mounted on the edges of a blank cathode, in order to provide seals between the inner edges of the edge strips 3 shown in FIG. 1 and the main surfaces of the blank cathode 1.

FIG. 1 illustrates prior art edge strips 3 on a blank stainless steel cathode 1 used for electrolytic deposition of copper. Reference numerals 4 designate the above-mentioned sprayed-on wax bead. The edges of the wax beads 4 are quite un-uniform, which results in jagged edges of the layers of copper electrodeposited on the cathode 1. The process of spraying wax beads 4 is required every time cathode 1 is "pulled" from the electrolytic cell to remove the electrodeposited copper sheets. The wax spraying equipment is costly, as is the floor space required for it. The amount of time and labor required for spraying wax beads 4 every time the cathode is pulled is costly. The wax from the prior wax bead must be removed from the electrode and edge strips every time the electrode is "pulled". This is done with 190° Fahrenheit water, overheating the edge strips and causing them to prematurely deteriorate. Furthermore, the jagged edges of the sheets of copper resulting from the un-uniform wax beads are unsatisfactory to copper buyers.

The state of the art for edge strips is indicated in "Edge Protection for Starter-Blanks and 'Permanent' Matrix-Cathodes: A Systematic Approach to Solve Old Problems", by P. Berger, pages 469–479, and in U.S. Pat. No. 4,406,769 by Berger.

It would be highly desirable to provide an improved edge strip protector that avoids the need for expensive equipment utilized to spray the above-described wax beads to prevent electrolyte penetration between edge strips and blank cathodes.

Dual durometer extruding processes are known, and flexible dual durometer strips are commonly used around edges of refrigerator doors to seal the doors to refrigerator bodies. Use of dual durometer extruded structures to provide both structural rigidity and resilient contact to achieve an effective seal with a plate is not known, especially in the electrowinning industry.

SUMMARY OF THE INVENTION

Accordingly, it is an object of the invention to provide an improved edge strip and method for preventing substantial electrolyte penetration between edge strips and blank electrode edge surfaces.

It is another object of the invention to provide an improved edge protector that provides smooth edges of electrodeposited sheets that are recovered from electrodes.

It is another object of the invention to provide an edge strip that can be reused many times, yet prevents jagged edges on sheets of electrodeposited metal removed from an electrode, and avoids the need for wax beads to seal the edge strip to the electrode.

Briefly described, and in accordance with one embodiment thereof, the invention provides dual durometer edge strips for preventing substantial electrolyte penetration between the edge strips and opposed surface portions along an edge of a blank electrode, wherein the edge strip includes a U-shaped channel section that is composed of relatively hard, rigid plastic material, and wherein a pair of resilient lips are attached along the ends of the legs of the U-shaped channel section to form tight, durable seals with the opposed surface portions along the edge of the electrode. The dual durometer edge strip is made by an extruding process wherein resilient lips are simultaneously extruded with and attached to hard, rigid legs of the U-shaped channel section. In the described embodiment of the invention, the rigid U-shaped channel section of the edge strip has a durometer rating in the range from 80 to 85 on the "D" scale, and the resilient lips have a durometer rating of approximately 72 on the "A" scale. The need is avoided for expensive equipment to apply the above-described wax beads every time the electrode is pulled to remove electrodeposited sheets of metal and straight, even edges are obtained on the sheets of recovered metal removed from the electrode.

BRIEF DESCRIPTION OF THE DRAWINGS

FIG. 1 is a perspective view of prior art edge strips installed on a blank stainless steel cathode.

FIG. 1A is section view along section line 1A–1A of FIG. 1.

FIG. 2 is a partial perspective view of the dual durometer edge strip of the present invention.

FIG. 3 is a diagram useful in explaining the apparatus and process for extruding the dual durometer edge strip of FIG. 2.

DETAILED DESCRIPTION OF THE PREFERRED EMBODIMENT OF THE INVENTION

Referring to FIG. 2, dual durometer edge strip 10 of the present invention includes an elongated, rigid plastic U-shaped section 11 including two spaced parallel legs 14 and a horizontal connecting section 15. A channel 12 is formed between the vertical legs 14 for receiving an edge of a stainless steel electrode such as 1 in FIG. 1.

In accordance with the present invention, the upper U-shaped section 11 is extruded of hard plastic material, such as PVC (polyvinylchloride) having a hardness in the range of 80 to 85 durometers on the D scale, although a variety of other plastics can be used. Those skilled in the art know that durometer hardness values indicate the indention or resistance to indentation of the indentor point of a durometer. High values indicate harder materials. The "A" durometer scale is used for flexible materials and the "D" durometer scale is used for rigid materials. See the ASTM D2240 Test Method for Rubber Property-Durometer Hardness.

Further in accordance with the present invention, a pair of elongated downwardly tapered resilient lips 16 are extruded with and securely attached by molecular bonding along interfaces 17 to the upper section 11 to provide the completed edge strip 10. Resilient lips 16 can be extruded from flexible PVC material to have a durometer rating preferably in the range from 69 to 75 on the "A" scale. As those skilled in the art know, the durometer or hardness/flexibility of the extruded PVC can be selected by controlling the amount of plasticizer in the resin.

In the described embodiment of the invention, the width of the main groove 12 between legs 14 is approximately one-eighth of an inch, to accommodate the edges of a stainless steel blank cathode the thickness of which also is about one-eight of an inch. The height 36 of each of the legs 14 is approximately one-half inch. The width of end leg 14 is about one-fourth of an inch. The thickness 39 of the portion of U-shaped section 11 connecting legs 14 is approximately five-sixteenths of an inch.

The height 35 of each of the resilient lips 16 is approximately three-eighths of an inch. The resilient lips 16 taper inwardly as shown to effectuate pressure contact with the opposed edge surface portions of stainless steel cathode 1 (FIG. 1). The upper inner surfaces 28 of resilient lips 16 slope inwardly to vertical gap 20, the width of which is about one-sixteenth of an inch. The narrow, lower tips 19 of resilient lips 16 are oriented inward and are pressed together at the bottom of gap 20.

When edge strip 10 is installed on cathode 1, the inward force produced by the lower ends 19 of each of resilient lips 16 on the opposite edge surface portions of cathode 1 is sufficient to cause the inner surtaces of resilient lips 16 to conform tightly to the surfaces of cathode 1. This "gripping" of the opposed edge surface portions of cathode 1 by the inner surfaces of resilient lips 16 provides a reliable seal, substantially preventing penetration of electrolyte, thereby preventing electrodeposition of more than minute amounts of metal on the electrode surface under the resilient lips. In some cases, this gripping holds edge strip 10 securely on the edges of cathode 1 so that no lateral pins through the edge strip and corresponding holes in the cathode are required to hold the edge strip on the cathode.

The materials of which both the upper section 11 and resilient lips 16 are composed are resistant to the electrolyte solution, and therefore experience essentially no degradation with continued use. A number of the edge strips 10 have been tested in a copper electrowinning facility for approximately a year, with no appreciable loss of functionality.

A cathode in that facility is "pulled" from the electrolyte periodically, i.e., every 12 days to remove the deposited copper sheets. When cathode 1 is pulled from the electrolyte, a sheet of copper on one side of the cathode may be removed by striking the opposite side with a mallet while a high speed jet of air is aimed at the cathode edges to effectuate separation of the sheet from the faces of the cathode.

Any residual bit of copper that has deposited on tne surface of the electrode between the resilient lips 16 and the surfaces of the cathode is very thin, and is readily pulled from beneath the resilient lips 16, and then can be easily removed from the edges of the much thicker sheet of recovered copper. My experience has been that usually no such residual copper is deposited under the lips 16, however.

The above-described dual durometer edge strip thus provides the advantage of smooth edges of the recovered sheets of metal removed from the electrode, while avoiding the cost of time, labor, and equipment utilized to spray wax bead seals between certain prior edge strips and the cathode surface, and avoids the need to remove pins holding other prior edge strips on their cathodes. It is less costly and more convenient to use than the electrode edge protector described in U.S. Pat. No. 4,406,769, (which is incorporated herein by reference), although the present invention can be used in combination with the structure disclosed in that patent to provide the advantage of further improved contact and sealing between the inner surfaces of the resilient lips and the edge surfaces of the cathode.

FIG. 3 diagrammatically illustrates an extruding apparatus 21 which is utilized to manufacture the dual durometer edge strip 10 of FIG. 2. The extruding system 21 includes a first extruder 22 and a second extruder 30. Extruder 22 extrudes material of which the U-shaped channel section 12 of the edge strip is formed. Reference numeral 11A designates a length of the channel section 11 being extruded from extruder 22. The length 11A of U-shaped channel section 11 is sufficiently rigid to allow it to hold its shape while moving in the direction of arrow 24 into a co-extrusion die 25, as indicated by arrow 26.

Extruder 30 contains the plastic material of which resilient lip 16 is composed. This material is extruded as indicated by numeral 16A in the direction of arrow 32 into coextrusion die 25 and is forced out of an opening 29 in the righthand side of die 25 having precisely the same shape as the cross-sectional end view of edge strip 10 shown in FIG. 2. The temperatures and pressures of the resilient lip material 16A and the U-shaped channel material 11A are such that the extruded dual durometer edge strip 10 is extruded from opening 29. Numeral 23A designates the U-shaped channel section 11 and numeral 16 designates the resilient lips previously described, moving together in the direction of arrow 27. Although one skilled in the art can readily select resin to obtain a selected durometer rating, attached hereto are specification sheets for the resin materials from which the channel section 11 and the resilient lips are extruded. (More specifically, the resilient lips are extruded from GEON 8332 Gray 250 extrusion compound, from BF Goodrich Chemical Company, 6100 Oak Tree Blvd., Cleveland, Ohio. The U-shaped channel is extruded from GEON 85857 extrusion compound, also from BF Goodrich Chemical Company. The material for channel section 11 is heated to 330 degrees Fahrenheit, and the resin for the resilient lips is heated to 310 degrees Fahrenheit, and the channel 11 and resilient lips 16 are extruded from die 25 at 12 to 13 feet per second.

While the invention has been described with reference to a particular embodiment thereof, those skilled in the art will be able to make various modifications to the described embodiment of the invention without departing from the true spirit and scope thereof. It is intended that all elements and steps which perform substantially the same function in substantially the same manner to achieve the same result are within the scope of the invention.

I claim:

1. An edge protector for an electrode having an edge and opposed first and second edge surface portions along the edge, the edge protector comprising in combination:
   (a) an elongated rigid member having a cross-sectional portion that is generally U-shaped including elongated, generally parallel first and second jaw members that define between them an elongated slot receiving the first and second edge surface portions of the electrode, the first and second jaw members including first and second end surfaces;
   (b) elongated first and second resilient lips attached to the outer ends of the first and second jaws, respectively, the first and second resilient lips defining between them an elongated gap that is aligned with and narrower than the elongated slot, the first and second resilient lips having first and second inner surfaces, respectively, that are pressed tightly against and conform to the first and second edge surface portions, respectively,
   whereby penetration of electrolyte between the first and second edge surface portions and the first and second inner surfaces is substantially impeded and any metal electrodeposited on the first and second edge surfaces is easily pulled out from under the first and second inner surfaces without tearing.

2. The edge protector of claim 1 wherein the rigid member and the first and second resilient lips are composed of electrically insulative plastic material.

3. The edge protector of claim 2 wherein the rigid member is composed of plastic material having a hardness in the range from 80 to 85 durometers on the "D" scale.

4. The edge protector of claim 2 wherein the first and second resilient lips are composed of material having a hardness in the range from 69 to 75 durometers on the "A" scale.

5. The edge protector of claim 2 wherein the first and second resilient lips and the first and second jaws are molecularly bonded together at the first and second end surfaces, respectively.

6. The edge protector of claim 5 wherein the rigid member is composed of polyvinylchloride and the first and second resilient lips are composed of polyvinylchloride, the rigid member and the first and second resilient lips being co-extruded.

7. The edge protector of claim 2 wherein the first and second end surfaces are generally coplanar.

8. A method of reducing electrodeposition of metal on first and second edge surface portions of an electrode, the method comprising the steps of:
   (a) melting first and second plastic materials;
   (b) extruding the first plastic material to form an elongated first member that has a substantially U-shaped cross-sectional portion and substantially parallel first and second jaw sections defining an elongated slot, the first and second jaw sections having first and second end surfaces, respectively, the elongated member being sufficiently rigid to hold its shape immediately after the extruding;
   (c) extruding the second plastic material to form elongated, soft second and third members;
   (d) forcing the first, second, and third members into a co-extrusion die having an outlet opening including a generally inverted U-shaped portion that conforms to the shape of the first member, and forcing the elongated first member through the inverted U-shaped portion, and simultaneously forcing the second and third members through the outlet opening, the outlet opening including first and second portions that extend beyond the first and second end surfaces of the first and second jaw sections to shape the second and third members, respectively, into first and second resilient lips attached to the first and second end surfaces, to thereby form a dual durometer edge protector; and
   (e) attaching the dual durometer edge protector to an edge of the electrode, causing a first inner surface of the first resilient lip to press tightly against and conform to the first edge surface portion, and causing a second inner surface of the second resilient lip to press tightly against and conform to the second edge surface portion, thereby substantially preventing electrolyte from penetrating under the first and second inner surfaces.

9. The method of claim 1 including curing the first member to cause it to have a hardness of 80 to 85 durometers on the "D" scale and to cause the first and second resilient lips to have a hardness of 69 to 75 durometers on the "A" scale.

10. The method of claim 9 including electrodepositing sheets of metal on opposed faces of the electrode, removing the electrode out of an electrolyte, and separating the sheets from the electrode, the separating including pulling any thin layers of metal electrodeposited o the first and second edge surface potions out from under the first and second inner surfaces without tearing such thin layers, and causing the first and second resilient lips to yield enough to permit such pulling.

* * * * *